Patented Oct. 6, 1925.

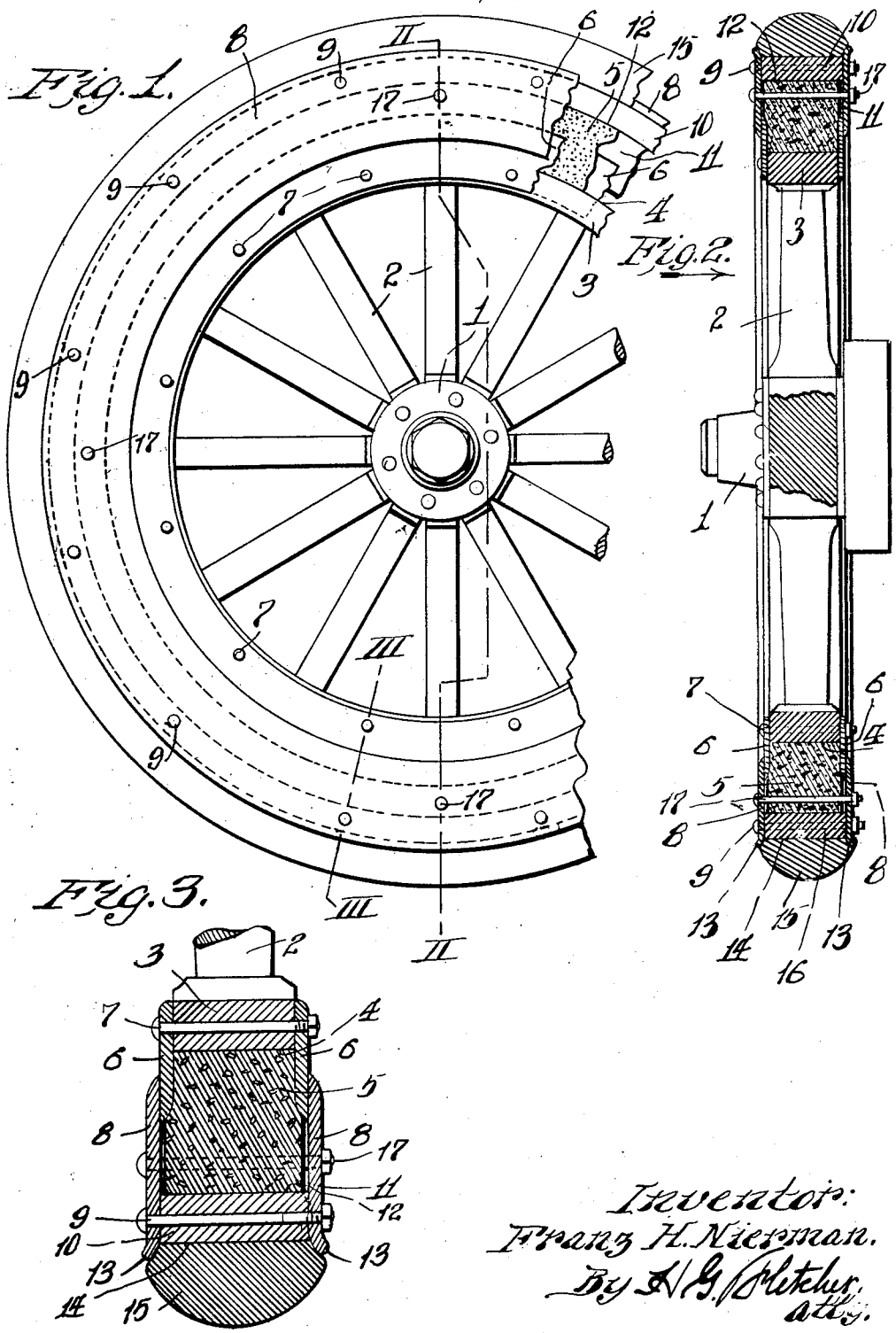

1,556,156

UNITED STATES PATENT OFFICE.

FRANZ H. NIERMAN, OF JEFFERSON CITY, MISSOURI.

RESILIENT WHEEL.

Application filed December 5, 1921. Serial No. 519,940.

*To all whom it may concern:*

Be it known that I, FRANZ H. NIERMAN, a citizen of the United States of America, and a resident of Jefferson City, county of Cole, and State of Missouri, have invented a certain new and useful Improvement in Resilient Wheels, of which the following is a specification.

This invention relates to an improvement in wheels for vehicles, and has for its primary object the purpose of providing an improved cushioning means which is built in the wheels, whereby such wheels will have the approximate resiliency as is provided by the pneumatic tire.

Another object of the invention is to provide a cushioning element which is annularly arranged between the felloe and tire of the wheel.

Other and further objects will appear in this specification, and be specifically pointed out in the appended claims, reference being had to the accompanying drawings, exemplifying the invention, and in which:—

Figure 1 is a fragmentary side elevation partly in section of this improved wheel.

Figure 2 is a vertical section taken approximately on the line II—II of Fig. 1.

Figure 3 is an enlarged transverse section taken on the line III—III of Fig. 1.

With reference to the accompanying drawings this improved wheel is provided with the usual hub 1, having the spokes 2 radiating therefrom and being connected to the felloe 3.

Mounted on the periphery 4 of the felloe 3 is an annular band of rubber 5 which is preferable of a spongy consistency so as to provide a maximum of resiliency, said band 5 being retained in its position of peripheral engagement with the felloe 3 by a pair of annular flanges 6, each being secured to a respective side of the felloe by bolts 7 which are passed through said felloe and said flanges.

It is preferable for the band 5 to be wider than the width of the felloe 3 so that when said band is engaged by the pair of flanges 6 it will be clamped therebetween.

Adapted to be engaged against each of the flanges 6 on the out-side thereof is an annular plate 8, and engaged between said plates and secured thereto by a series of bolts 9 is an outer felloe 10, said bolts 9 passing through said felloe and said plates.

From an inspection of Figures 2 and 3 it is to be noted that an annular housing 11 is provided between the inner felloe 3 and the outer felloe 10, the sides of said housing being closed by respective pairs of flanges and plates 6 and 8, and in which the outer periphery 12 of the rubber band or cushion 5 is engaged against the inner periphery of the outer felloe 10.

Each of the plates 8 is provided with an annular portion 13 which extends beyond the outer periphery of the outer felloe 10, thereby providing a channel or rim 14 and mounted within said channel is a solid rubber tire 15.

From the aforesaid construction of this improved wheel it is obvious that a yielding construction is provided between the outer felloe 10 and the inner felloe 3, and that a sliding relation is provided between the pair of flanges 6 and the pair of plates 8.

In the operation of a wheel of this improved character, when said wheel is secured to the axle of a vehicle, the inner part of the wheel which is comprised of the hub 1, spokes 2, felloe 3 and flanges 6 carried thereby, will be forced downwardly by the weight of the vehicle, in which compression strains will be applied to the portion of the band or cushion 5, which is adjacent the ground, and in which the plates 8 will slide on the flanges 6, said downwardly forcing movement of the inner part of the wheel being continuous on the adjacent ground engaging portion of the band 5 as the wheel is revolved.

If the axle on which this improved wheel is mounted is driven, the revolving twisting strain applied to the inner part of the wheel will be carried to the ground engaging part 16 of the wheel which is comprised of the plates 8, felloe 10 and tire 15, through the rubber band or cushion 5 by the bolts 17 which are passed transversely through the plates 8 and band 5, said bolts 17 preventing the annular cushion 5 from slipping on the inner periphery of the outer felloe 10.

On account of the housing 11 which is provided for the reception of the resilient cushion or band 5, said band is protected against being engaged by obstacles on the roadway.

What I claim is:—

1. In a vehicle wheel, a felloe therefor, cushioning means surrounding the outer periphery of said felloe, a pair of clamping plates carried by said felloe adapted to provide means for gripping said cushioning means sidewise thereof, an outer felloe located over said cushioning means having a pair of plates secured thereto which are slidable over said other plates, and a resilient tire carried by said outer felloe.

2. In a vehicle wheel, a felloe therefor, cushioning means surrounding the outer periphery of said felloe, a pair of plates clamped to the sides of said felloe for gripping said cushioning means therebetween, an outer felloe located over said cushioning means having a pair of plates clamped to the sides thereof which are slidable over said other plates, and securing means passing through said cushioning means and said plates of said outer felloe.

FRANZ H. NIERMAN.